US012810836B2

(12) United States Patent
Panther et al.

(10) Patent No.: US 12,810,836 B2
(45) Date of Patent: Nov. 24, 2026

(54) HEADSET ARRANGEMENT

(71) Applicant: Harman Becker Automotive Systems GmbH, Karlsbad (DE)

(72) Inventors: Heiko Gernot Albert Panther, Berlin (DE); Claus Mygind Rasmussen, Herning (DK)

(73) Assignee: Harman Becker Automotive Systems GmbH, Karlsbad (DE)

( * ) Notice: Subject to any disclaimer, the term of this patent is extended or adjusted under 35 U.S.C. 154(b) by 150 days.

(21) Appl. No.: 18/911,061

(22) Filed: Oct. 9, 2024

(65) Prior Publication Data

US 2025/0118283 A1 Apr. 10, 2025

(30) Foreign Application Priority Data

Oct. 9, 2023 (EP) .................................... 23202389

(51) Int. Cl.
*G10K 11/178* (2006.01)
*H04R 1/10* (2006.01)
*H04S 7/00* (2006.01)

(52) U.S. Cl.
CPC ..... *G10K 11/17827* (2018.01); *H04R 1/1083* (2013.01); *H04S 7/303* (2013.01)

(58) Field of Classification Search
CPC ............ G10K 11/178; G10K 11/17827; H04R 5/033; H04R 2460/01; G10L 2021/02082; G10L 21/0208; H04B 1/385; H04B 2001/3866
See application file for complete search history.

(56) References Cited

U.S. PATENT DOCUMENTS

| | | | | |
|---|---|---|---|---|
| 2007/0015467 | A1 | 1/2007 | Nagayasu et al. | |
| 2017/0195794 | A1 | 7/2017 | Vaynberg et al. | |
| 2018/0191911 | A1 | 7/2018 | Matsui et al. | |
| 2018/0198541 | A1 | 7/2018 | Harris et al. | |
| 2024/0334666 | A1 * | 10/2024 | Miglietta | C09D 5/24 |
| 2024/0357305 | A1 * | 10/2024 | Feng | G10K 11/17821 |
| 2024/0430625 | A1 * | 12/2024 | Guo | H04R 25/45 |

FOREIGN PATENT DOCUMENTS

| | | |
|---|---|---|
| WO | 2022218643 | 10/2022 |

OTHER PUBLICATIONS

Extended European Search Report issued in corresponding EP Application 23202389.5, issued Mar. 21, 2024, 12 pages.

* cited by examiner

*Primary Examiner* — Kile O Blair
(74) *Attorney, Agent, or Firm* — Burris Law, PLLC

(57) ABSTRACT

A method includes a plurality of headsets, wherein each headset of the plurality of headsets includes one or more loudspeakers, one or more second microphones, and a first microphone. The method also includes a headset arrangement configured to capture speech from a first user by means of the first microphone of a first headset of the plurality of headsets and transmit the captured speech from the first headset to one or more other headsets. The headset arrangement is also configured to reproduce the transmitted speech at respective listening positions of the at least two listening positions related to users of the one or more other headsets by means of the one or more loudspeakers of the one or more other headsets and cancel speech originating from the first user and being transmitted to the at least two listening positions related to users of the respective one or more other headsets.

8 Claims, 3 Drawing Sheets

HEADSET ARRANGEMENT

CROSS-REFERENCE TO RELATED APPLICATIONS

Figure 1:
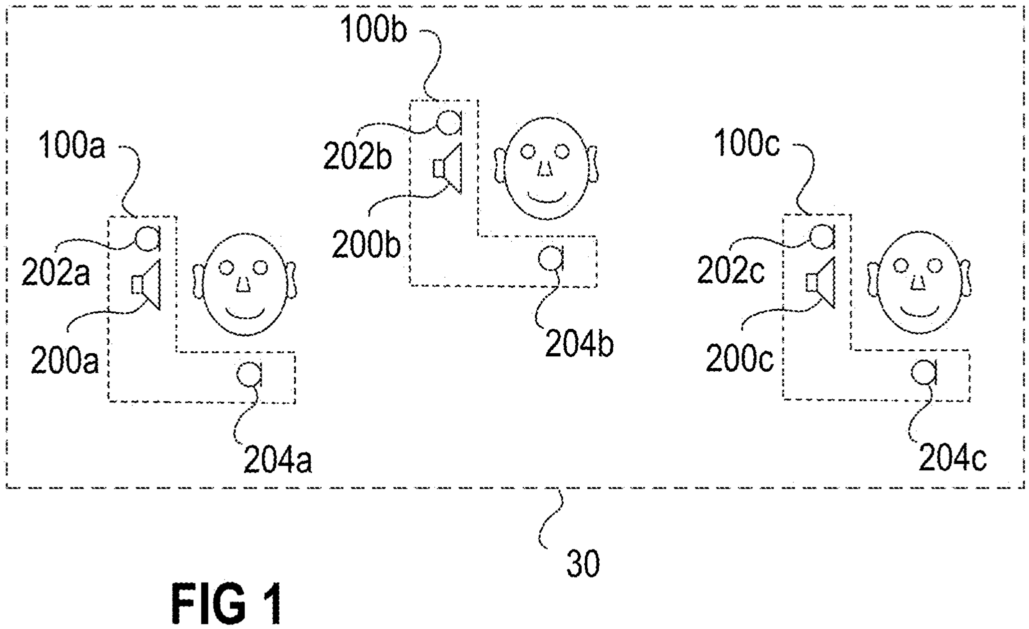

This application claims priority to and the benefit of EP 23202389 filed on Oct. 9, 2023. The disclosure of the above application is incorporated herein by reference.

FIELD

The present disclosure relates to a headset arrangement, in particular to a headset arrangement comprising two or more headsets in a listening environment.

BACKGROUND

The statements in this section merely provide background information related to the present disclosure and may not constitute prior art.

In an arrangement comprising two or more headsets in a listening environment, speech originating from a first user related to a first headset of the two or more headsets is transmitted to one or more other users related to a second and any further headsets of the two or more headsets directly. Further, the speech originating from the first user is captured by a microphone of the first headset, transmitted to the second and any further headsets of the two or more headsets, and is output by one or more loudspeakers of the respective second or further headsets. That is, other users will receive speech originating from the first user twice. The speech provided to other users via the headsets may be delayed as compared to the speech being transmitted directly. This is because processing and transmitting the speech may require a certain amount of time while the directly transmitted speech travels through air comparably fast. It is, however, also possible that the speech transmitted via the headset reaches another user before the directly transmitted speech (e.g., if users are arranged at a great distance from each other). Both may result in an unwanted "echo" effect, where the speech received at a later point in time is perceived as an echo of the speech received at an earlier point in time.

There is a need for a headset arrangement and a method that reduce or even avoid an echo effect, resulting in a distraction free communication between different users of the headset arrangement.

SUMMARY

This section provides a general summary of the disclosure and is not a comprehensive disclosure of its full scope or all of its features.

A headset arrangement includes a plurality of headsets in a listening environment, each headset in the plurality of headsets including one or more loudspeakers, each of the one or more loudspeakers being configured to radiate sound that corresponds to a sound signal towards at least one of two listening positions related to a user of the respective headset, each of the two listening positions being located at an entrance of an ear canal of the respective user, one or more second microphones, each of the one or more second microphones being configured to pick up noise radiated by at least one noise source via a primary path to at least one of the two listening positions, and a first microphone configured to capture speech originating from the user related to the respective headset, wherein the headset arrangement is configured to capture speech originating from a first user related to a first headset in the plurality of headsets by means of the first microphone of the first headset, transmit the captured speech from the first headset to one or more other headsets in the plurality of headsets, reproduce the transmitted speech at respective listening positions related to users of the respective one or more other headsets by means of the one or more loudspeakers of the one or more other headsets, and cancel speech originating from the first user and being transmitted to the listening positions related to users of the respective one or more other headsets via a primary path by means of passive noise cancellation and/or an active noise cancellation method.

A method for operating a headset arrangement is disclosed herein. The headset arrangement includes a plurality of headsets in a listening environment, each headset in the plurality of headsets including one or more loudspeakers, each of the one or more loudspeakers being configured to radiate sound that corresponds to a sound signal towards at least one of two listening positions related to a user of the respective headset, each of the two listening positions being located at an entrance of an ear canal of the respective user, one or more second microphones, each of the one or more second microphones being configured to pick up noise radiated by at least one noise source via a primary path to at least one of the two listening positions, and a first microphone configured to capture speech originating from the user related to the respective headset. The method includes capturing speech originating from a first user related to a first headset in the plurality of headsets by means of the first microphone of the first headset, transmitting the captured speech from the first headset to one or more other headsets in the plurality of headsets, reproducing the transmitted speech at respective listening positions related to users of the respective one or more other headsets by means of the one or more loudspeakers of the one or more other headsets, and cancelling speech originating from the first user and being transmitted to the listening positions related to users of the respective one or more other headsets via a primary path by means of passive noise cancellation and/or an active noise cancellation method.

Other systems, features and advantages of the disclosure will be or will become apparent to one with skill in the art upon examination of the following detailed description and figures. It is intended that all such additional systems, methods, features and advantages included within this description, be within the scope of the present disclosure and be protected by the following claims.

Further areas of applicability will become apparent from the description provided herein. It should be understood that the description and specific examples are intended for purposes of illustration only and are not intended to limit the scope of the present disclosure.

DRAWINGS

Figure 2:
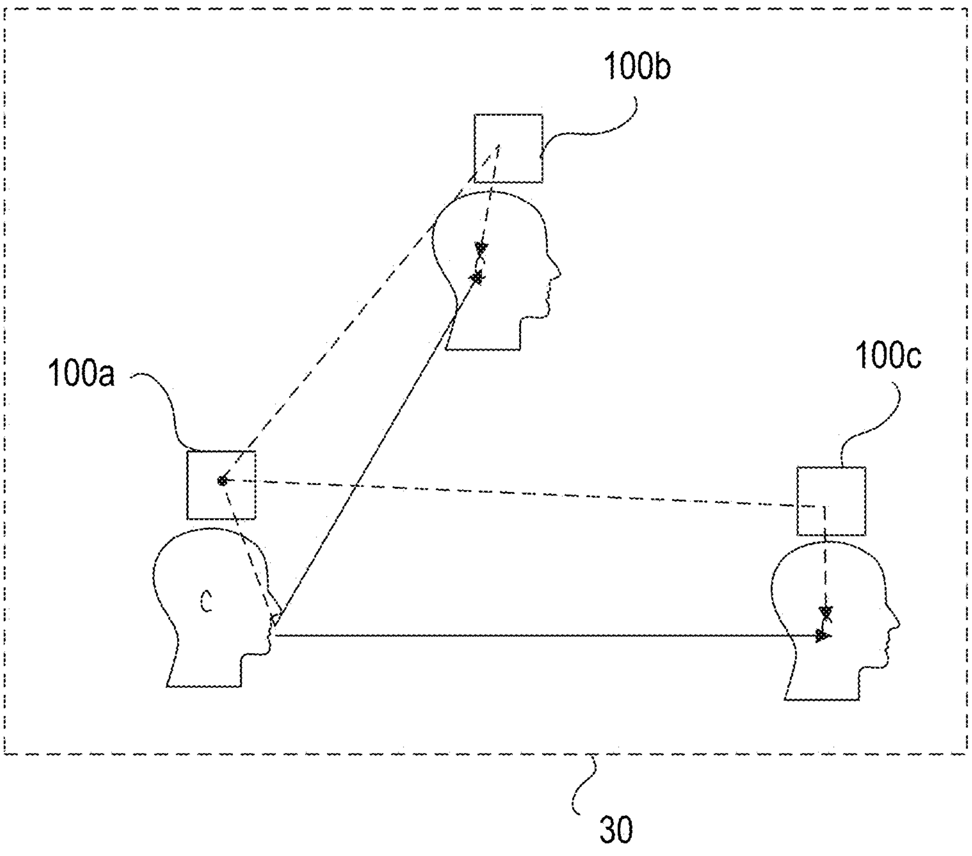
Figure 3:
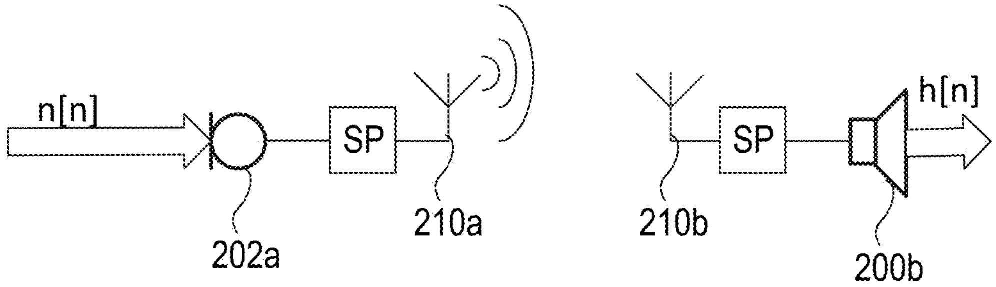
Figure 4A:
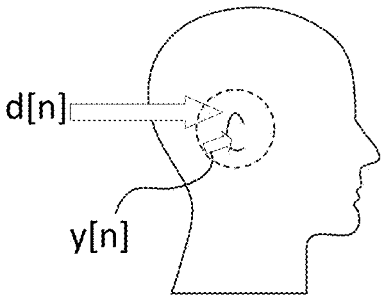
Figure 4B:
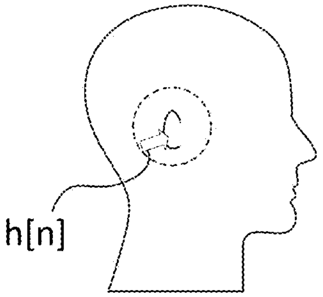
Figure 5A:
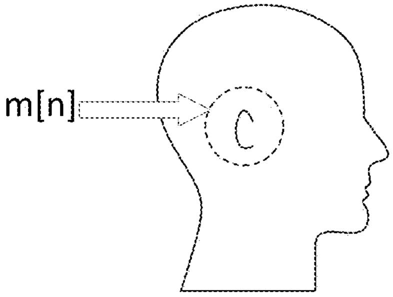
Figure 5B:
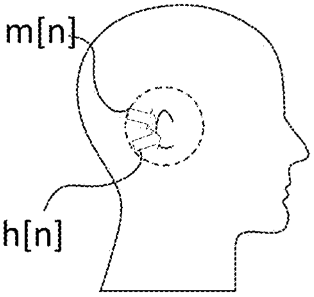
Figure 6:
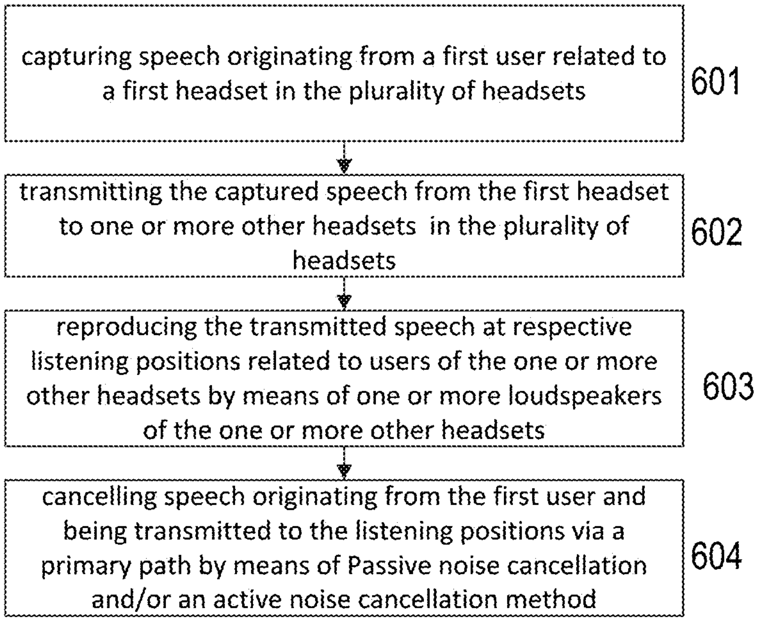

In order that the disclosure may be well understood, there will now be described various forms thereof, given by way of example, reference being made to the accompanying drawings, in which:

FIG. 1 schematically illustrates a headset arrangement comprising a plurality of headsets arranged in a listening environment;

FIG. 2 schematically illustrates speech transmitted between users of the headset arrangement;

FIG. 3 schematically illustrates speech transmitted between users of the headset arrangement via a secondary path;

FIGS. 4A and 4B schematically illustrate different steps of a method according to one or more embodiments of the disclosure;

FIGS. 5A and 5B schematically illustrate different steps of another method according to one or more embodiments of the disclosure; and FIG. 6 schematically illustrates a method according to one or more embodiments of the disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The headset arrangement and related method according to the various one or more embodiments described herein assist users of the headset arrangement in communication with each other without experiencing unwanted distractions due to an echo effect. FIG. 1 schematically illustrates a headset arrangement comprising a plurality of headsets 100. In the example illustrated in FIG. 1, the headset arrangement comprises three headsets 100*a*, 100*b*, 100*c*. Generally, however, a headset arrangement may comprise only two, three or even more than three individual headsets 100. Each headset 100 in the plurality of headsets 100 comprises one or more loudspeakers 200, each of the one or more loudspeakers 200 being configured to radiate sound that corresponds to a sound signal towards at least one of two listening positions related to a user of the respective headset 100, each of the two listening positions being located at an entrance of an ear canal of the respective user. According to one example, a headset 100 comprises a single loudspeaker 200 that radiates sounds towards both ears of a respective user. It is, however, also possible that a headset 100 comprises separate loudspeakers 200 for the different listening positions. That is, one or more loudspeakers 200 may be configured to radiate sound towards a first ear of the respective user, and one or more loudspeakers 200 may be configured to radiate sound towards a second ear of the respective user. Each headset 100 in the plurality of headsets 100 further comprises one or more second microphones 202, each of the one or more second microphones 202 being configured to pick up noise radiated by at least one noise source via a primary path to at least one of the two listening positions, and a first microphone 204 configured to capture speech originating from the user related to the respective headset 100. For example, each headset 100 of the plurality of headsets 100 may comprise a microphone boom arm, and the first microphone 204 of a headset 100 may be arranged in the microphone boom arm. The first microphone 204, however, may be attached to the respective headset 100 in any other suitable way. According to another example, the first microphone 204 is arranged in or attached to a cable or cord attached to the respective headset 100. It is, however, also possible that the first microphone 204 is not directly or indirectly attached to the respective headset 100 at all. According to other examples, the first microphone 204 may be attached to clothes or devices worn by the respective user (e.g., devices worn on the head, neck, or shoulders).

Headsets 100 can generally be implemented in many different ways. Some headsets comprise ear cups that are arranged to cover or surround the ears of the respective user. In this case, the one or more loudspeakers 200 and the one or more second microphones 202 may be arranged in the respective ear cups. Other headsets 100 comprise ear buds that may be at least partly inserted into an ear canal of a user. In this case, the one or more loudspeakers 200 and the one or more second microphones 202 may be arranged in the ear buds. Other headset are known that comprise different support structures that can be used to position the one or more loudspeakers 200 and the one or more second microphones 202 with respect to the user's ears (e.g., a headband or neck band). It is even possible that the one or more loudspeakers 200 and the one or more second microphones 202 are arranged in a headrest of a vehicle, for example. Different headsets in the plurality of headsets may be identical or may differ from each other. That is, it is generally possible that one headset comprises ear cups, while another headset comprises ear buds. Any other combination of different headsets is generally possible.

The plurality of headsets 100 are all arranged in the same listening environment 30. The listening environment 30 may be a passenger compartment of a vehicle, a room, or hall, for example. According to one example, a headset arrangement as is disclosed herein may be used for a multi-player gaming event, where multiple players of a video game are located in one and the same room and wish to communicate with each other. This, however, is only one example.

In an arrangement comprising two or more headsets 100 in a listening environment 30, speech originating from a first user related to a first headset 100*a* of the two or more headsets 100*a*, 100*b*, 100*c* is transmitted to one or more other users related to a second and any further headsets 100*b*, 100*c* of the two or more headsets 100 directly through free air (primary path). Further, the speech originating from the first user is captured by the first microphone 204*a* of the first headset 100*a*, transmitted to the second and any further headsets 100*b*, 100*c* of the two or more headsets 100, and is output by one or more loudspeakers 200*b*, 200*c* of the respective second or further headsets 100*b*, 100*c*. That is, other users will generally receive speech originating from the first user twice. The speech provided to other users via the headsets 100 (secondary path) may be delayed as compared to the speech being transmitted directly (primary path). This is because processing, transmitting, and reproducing the speech may require a certain amount of time. In some cases it may also be possible that the speech transmitted directly via the primary path is delayed as compared to the speech provided to other users via the headsets 100 (secondary path). This may be the case when processing, transmitting, and reproducing the speech is performed comparably fast and the users are located comparably far from each other such that it takes a certain amount of time for the speech to be transmitted directly from one user to another. The speech being transmitted via the primary path reaching a user at a different point in time than the speech being transmitted via the headsets 100 (secondary path) may result in an unwanted "echo" effect, where the speech received at a later point in time is perceived as an echo of the speech received at an earlier point in time. This is schematically illustrated in FIG. 2, where speech originating from a first user reaching an ear of another user via a direct path (primary path) is indicated with continuous arrows, and speech originating from the first user and transmitted to other users by means of the headset arrangement (secondary path) is indicated with dashed arrows. In this example, the speech being transmitted directly via the primary path reaches the other users first.

A headset arrangement according to one or more embodiments of the disclosure comprises a plurality of headsets 100 in a listening environment 30, each headset 100 in the plurality of headsets 100 comprising one or more loudspeakers 200, each of the one or more loudspeakers 200 being configured to radiate sound that corresponds to a sound signal towards at least one of two listening positions related to a user of the respective headset 100, each of the two listening positions being located at an entrance of an ear canal of the respective user. Each headset 100 in the plurality of headsets 100 further comprises one or more second microphones 202, each of the one or more second microphones 202 being configured to pick up noise radiated by at least one noise source via a primary path to at least one of the two listening positions, and a first microphone 204 configured to capture speech originating from a user related to the respective headset 100. In order to reduce or even avoid an "echo" effect, the headset arrangement is configured to capture speech n[n] originating from a first user related to a first headset 100*a* in the plurality of headsets 100 by means of the first microphone 204*a* of the first headset 100*a*, transmit the captured speech n[n] from the first headset 100*a* to one or more other headsets 100*b*, 100*c* in the plurality of headsets 100, reproduce the transmitted speech h[n] at respective listening positions related to users of the respective one or more other headsets 100*b*, 100*c* by means of the one or more loudspeakers 200*b*, 200*c* of the one or more other headsets 100*b*, 100*c*, and cancel speech originating from the first user and being transmitted to the listening positions related to users of the respective one or more other headsets 100*b*, 100*c* via a primary path by means of passive noise cancellation and/or an active noise cancellation method. That is, speech originating from the first user is only received at each listening position related to the users of the one or more other headsets 100*b*, 100*c* once. Speech originating from the first user and transmitted via a primary path (directly through air) will be suppressed at the listening positions.

If, for example, a headset 100 of the one or more other headsets 100*b*, 100*c* comprises ear cups or ear buds, it is generally possible to cancel speech originating from the first user and being transmitted to the listening positions related to users of the respective one or more other headsets 100*b*, 100*c* via a primary path solely by means of passive noise cancellation. That is, the ear cups or ear buds may be designed to inhibit any speech transmitted via the primary path from even reaching the respective listening positions. For example, the ear cups or ear buds may comprise an acoustically damping material. However, in many cases it may be difficult or even impossible to entirely inhibit speech transmitted via the primary path from reaching the respective listening positions. In many cases, the speech may only be partly damped, but may still reach the respective listening position. That is, active noise cancellation methods may be used in addition to passive noise cancellation in order to also cancel the damped speech reaching the respective listening positions. In the case of entirely open systems (e.g., headset worn on head, neck, or shoulders of a user, or arranged in a headrest of a vehicle), passive noise cancellation may not be possible at all and speech originating from the first user and being transmitted to the listening positions related to users of the respective one or more other headsets 100*b*, 100*c* via a primary can only be cancelled path by means of an active noise cancellation method.

Referring to FIG. 3, components desired to transmit speech n[n] originating from a first user via a secondary path (via the headset arrangement) to another user are schematically illustrated. Speech n[n] originating from the first user related to a first headset 100*a* in the plurality of headsets 100 is captured by means of the first microphone 204*a* of the first headset 100*a*. The captured speech n[n] may subsequently be processed by suitable signal processing SP means, before being transmitted from the first headset 100*a* to one or more other headsets 100*b*, 100*c* in the plurality of headsets 100. Any signals may be transmitted between different headsets 100 by means of wireless transmission, for example. That is, each headset 100 in the plurality of headsets 100 may comprise one or more antennas 210 for transmitting and/or receiving signals. The transmitted speech h[n], before being reproduced at a respective listening position by means of the one or more loudspeakers 200*b*, may be processed by suitable signal processing SP means, for example.

A listening position generally is a position at an entrance of an ear canal of an ear of a user. A user generally has two ears such that there are two listening positions per user. When wearing a headset comprising ear cups or ear buds, the listening positions are both covered by (arranged in) the ear cups or ear buds covering (arranged in) the respective ears. Ear cups and ear buds generally also passively damp ambient noise (including speech originating from users of the headset arrangement), as they cover the respective ears, and therefore the listening positions. It is, however, often not possible to entirely avoid ambient noise from entering the ear cups or ear buds and reaching the listening positions. Any ambient noise (including speech originating from users of the headset arrangement) reaching the listening positions will be efficiently damped by means of a suitable active noise cancellation method.

An active noise cancellation method may comprise for each of the listening positions related to the users of the respective one or more other headsets 100*b*, 100*c*, capturing an error signal by means of the one or more second microphones 202*b*, 202*c* of the one or more other headsets 100*b*, 100*c*, the error signal being representative of a disturbing noise signal d[n] reaching the listening position, the disturbing noise signal d[n] comprising noise as well as the speech originating from the first user transmitted via the primary path, generating a compensation signal y[n] based on the error signal, and suppressing the disturbing noise signal d[n] at the listening position by transferring the compensation signal y[n] to the respective listening position by means of the one or more loudspeakers 200*b*, 200*c*. The disturbing noise signal d[n] and the compensation signal y[n] received at the listening position are schematically illustrated in FIG. 4A. The transmitted speech h[n] reproduced at the listening position is schematically illustrated in FIG. 4B.

ANC systems are usually intended to reduce or even cancel a disturbing signal, such as noise, by providing at a listening position a noise reducing signal that ideally has the same amplitude over time but the opposite phase as compared to the noise signal. By superimposing the noise signal d[n] and the noise reducing signal y[n], the resulting signal ideally tends toward zero.

Some headsets 100 also provide a so-called transparency function. A user, while wearing a headset 100 of the plurality of headsets 100, may want to listen to ambient sounds in order to be aware of what is happening around them. As has been described above, ambient noise, however, is cancelled by means of passive noise cancellation and/or an active noise cancellation method together with the speech originating from the first user and transmitted via the primary path. In order for a user to be aware of what is happening around them, ambient noise may be captured by means of a microphone, and may be reproduced at the listening positions by means of the one or more loudspeakers 200*b*, 200*c*. When capturing ambient noise by means of a microphone, however, speech originating from the first user and transmitted via the primary path will be captured as well. It is generally possible that speech is identified in and removed from the captured noise signal, before reproducing the signal at the listening position. Such methods, however, are often complex and difficult to implement.

The headset arrangement, therefore, may be further configured, for each of the listening positions related to the users of the one or more other headsets 100*b*, 100*c*, to determine a time offset between a time of arrival at the listening position of speech originating from the first user transmitted via the primary path, and a time when the same speech is reproduced at the listening position by means of the one or more loudspeakers 200*b*, 200*c* of the respective headset 100*b*, 100*c*. The time offset can be determined in any suitable way, e.g., manually or automatically.

Each headset 100 in the plurality of headsets 100 may be further configured, for each of the listening positions related to the users of the one or more other headsets 100*b*, 100*c*, to capture an ambient noise signal m[n] by means of at least one microphone of the respective headset 100*b*, 100*c*, the ambient noise signal m[n] comprising noise as well as the speech originating from the first user transmitted via the primary path (see FIG. 5A), and reproduce the noise and the speech originating from the first user transmitted via the primary path to the listening position by transferring the ambient noise signal m[n] to the respective listening position by means of the one or more loudspeakers 200*b*, 200*c*, wherein a time between capturing the ambient noise signal m[n] and transferring the ambient noise signal m[n] to the respective listening position corresponds to the determined time offset (see FIG. 5B). According to one example, the one or more second microphones 202 of a headset 100 can be used to capture the ambient noise signal m[n]. It is, however, also possible that a headset 100 further comprises at least one third microphone that is configured to capture the ambient noise signal m[n]. That is, the ambient noise signal m[n] may be captured by the same or by different microphones than the error signal.

Now referring to FIG. 6, a method for operating a headset arrangement according to one or more embodiments of the disclosure is schematically illustrated. The headset arrangement comprises a plurality of headsets 100 in a listening environment 30, each headset 100 in the plurality of headsets 100 comprising one or more loudspeakers, each of the one or more loudspeakers 200 being configured to radiate sound that corresponds to a sound signal towards at least one of two listening positions related to a user of the respective headset 100, each of the two listening positions being located at an entrance of an ear canal of the respective user, one or more second microphones 202, each of the one or more second microphones 202 being configured to pick up noise radiated by at least one noise source via a primary path to at least one of the two listening positions, and a first microphone 204 configured to capture speech originating from the user related to the respective headset 100. The method comprises, capturing speech n[n] originating from a first user related to a first headset 100*a* in the plurality of headsets 100 by means of the first microphone 204*a* of the first headset 100*a* (step 601). The method further comprises transmitting the captured speech n[n] from the first headset 100*a* to one or more other headsets 100*b*, 100*c* in the plurality of headsets 100 (step 602). The method further comprises reproducing the transmitted speech h[n] at respective listening positions related to users of the respective one or more other headsets 100*b*, 100*c* by means of the one or more loudspeakers 200*b*, 200*c* of the one or more other headsets 100*b*, 100*c* (step 603), and cancelling speech originating from the first user and being transmitted to the listening positions related to users of the respective one or more other headsets 100*b*, 100*c* via a primary path by means of passive noise cancellation and/or an active noise cancellation method (step 604).

According to one example, an active noise cancellation method comprises for each of the listening positions related to the users of the respective one or more other headsets 100*b*, 100*c*, capturing an error signal by means of the one or more second microphones 202*b*, 202*c* of the one or more other headsets 100*b*, 100*c*, the error signal being representative of a disturbing noise signal d[n] reaching the listening position, the disturbing noise signal d[n] comprising noise as well as the speech originating from the first user transmitted via the primary path, generating a compensation signal y[n] based on the error signal, and suppressing the disturbing noise signal d[n] at the listening position by transferring the compensation signal y[n] to the respective listening position by means of the one or more loudspeakers 200*b*, 200*c* of a respective one of the one or more other headsets 100*b*, 100*c*.

The method may further comprise, for each of the listening positions related to the users of the respective one or more other headsets 100*b*, 100*c*, determining a time offset between a time of arrival at the listening position of speech originating from the first user transmitted via the primary path, and a time when the same speech is reproduced at the listening position by means of the one or more loudspeakers 200*b*, 200*c*.

According to one example, the method further comprises, for each of the listening positions related to the users of the respective one or more other headsets 100*b*, 100*c*, capturing an ambient noise signal m[n] by means of at least one microphone of the respective headset 100*b*, 100*c*, the ambient noise signal m[n] comprising noise as well as the speech originating from the first user transmitted via the primary path, and reproducing the noise and the speech originating from the first user transmitted via the primary path to the listening position by transferring the ambient noise signal m[n] to the respective listening position by means of the one or more loudspeakers 200*b*, 200*c*, wherein a time between capturing the ambient noise signal m[n] and transferring the ambient noise signal m[n] to the respective listening position corresponds to the determined time offset between a time of arrival at the listening position of speech originating from the first user transmitted via the primary path, and a time when the same speech is reproduced at the listening position by means of the one or more loudspeakers 200*b*, 200*c*.

It may be understood, that the illustrated systems are merely examples. While various embodiments of the present disclosure have been described, it will be apparent to those of ordinary skill in the art that many more embodiments and implementations are possible within the scope of the present disclosure. In particular, the skilled person will recognize the interchangeability of various features from different embodiments. Although these techniques and systems have been disclosed in the context of certain embodiments and examples, it will be understood that these techniques and systems may be extended beyond the specifically disclosed embodiments to other embodiments and/or uses and obvious modifications thereof. Accordingly, the present disclosure is not to be restricted except in light of the attached claims and their equivalents.

The description of embodiments has been presented for purposes of illustration and description. Suitable modifications and variations to the embodiments may be performed in light of the above description or may be acquired from practicing the methods. The described arrangements are exemplary in nature, and may include additional elements and/or omit elements. As used in this application, an element recited in the singular and proceeded with the word "a" or "an" should be understood as not excluding plural of said elements, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The described systems are exemplary in nature, and may include additional elements and/or omit elements. The subject matter of the present disclosure includes all novel and non-obvious combinations and sub-combinations of the various systems and configurations, and other features, functions, and/or properties disclosed. The following claims particularly point out subject matter from the above disclosure that is regarded as novel and non-obvious.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A headset arrangement comprising:

a plurality of headsets in a listening environment, wherein each headset of the plurality of headsets comprises:

one or more loudspeakers, wherein each loudspeaker of the one or more loudspeakers is configured to radiate sound that corresponds to a sound signal towards at least one of two listening positions related to a user of a respective headset of the plurality of headsets, and wherein each listening position of the at least two listening positions is located at an entrance of an ear canal of the user related to the respective headset;

one or more second microphones, wherein each microphone of the one or more second microphones is configured to pick up noise radiated by at least one noise source via a primary path to at least one listening position of the at least two listening positions; and a first microphone configured to capture speech originating from the user related to the respective headset, wherein the headset arrangement is configured to:

capture speech (n[n]) originating from a first user related to a first headset of the plurality of headsets by the first microphone of the first headset;

transmit the captured speech (n[n]) from the first headset to one or more other headsets of the plurality of headsets;

reproduce the transmitted speech (h[n]) at respective listening positions of the at least two listening positions related to users of the respective one or more other headsets by the one or more loudspeakers of the one or more other headsets; and cancel speech originating from the first user and being transmitted to the at least two listening positions related to users of the respective one or more other headsets via a primary path by a passive noise cancellation method, an active noise cancellation method, or a combination thereof, wherein, for each of the at least two listening positions related to the users of the respective one or more other headsets, the headset arrangement is further configured to:

determine a time offset between a time of arrival at the listening position of speech originating from the first user transmitted via the primary path and a time when the speech originating from the first user is reproduced at the listening position by the one or more loudspeakers of a respective headset of the one or more other headsets;

capture an ambient noise signal (m[n]) by at least one microphone of the respective headset, wherein the ambient noise signal (m[n]) comprises noise as well as the speech originating from the first user transmitted via the primary path; and reproduce the noise and the speech originating from the first user transmitted via the primary path to the listening position by transferring the ambient noise signal (m[n]) to the respective listening position by the one or more loudspeakers, wherein a time between capturing the ambient noise signal (m[n]) and transferring the ambient noise signal (m[n]) to the respective listening position corresponds to the determined time offset.

2. The headset arrangement of claim 1, wherein the active noise cancellation method comprises:

capturing, for each listening position of the at least two listening positions related to the users of the respective one or more other headsets, an error signal by the one or more second microphones of the one or more other headsets, wherein the error signal is representative of a disturbing noise signal (d[n]) reaching a listening position of the at least two listening positions, and wherein the disturbing noise signal (d[n]) comprises noise as well as the speech originating from the first user transmitted via the primary path;

generating a compensation signal (y[n]) based on the error signal; and suppressing the disturbing noise signal (d[n]) at the listening position by transferring the compensation signal (y[n]) to a respective listening position of the at least two listening positions by the one or more loudspeakers.

3. The headset arrangement of claim 1, wherein each headset of the plurality of headsets comprises a microphone boom arm, a cable, or a cord, and wherein the first microphone is arranged in or attached to the microphone boom arm, the cable, or the cord.

4. The headset arrangement of claim 1, wherein each headset of the plurality of headsets comprises two ear cups or ear buds, and one or more loudspeakers, wherein the one or more second microphones are arranged in each of the ear cups or ear buds.

5. The headset arrangement of claim 1, wherein the listening environment is a passenger compartment of a vehicle, a room, or a hall.

6. The headset arrangement of claim 5, wherein the listening environment is a passenger compartment of the vehicle, and wherein the one or more loudspeakers and the one or more second microphones of a headset of the plurality of headsets are arranged in a headrest of the vehicle.

7. A method for operating a headset arrangement, the headset arrangement comprising:

a plurality of headsets in a listening environment, wherein each headset of the plurality of headsets comprises:

one or more loudspeakers, wherein each loudspeaker of the one or more loudspeakers is configured to radiate sound that corresponds to a sound signal towards at least one of two listening positions related to a user of a respective headset of the plurality of headsets, and wherein each listening position of the at least two listening positions is located at an entrance of an ear canal of the user related to the respective headset;

one or more second microphones, wherein each microphone of the one or more second microphones is configured to pick up noise radiated by at least one noise source via a primary path to at least one listening position of the at least two listening positions; and a first microphone configured to capture speech originating from the user related to the respective headset, wherein the method comprises:

capturing speech (n[n]) originating from a first user related to a first headset of the plurality of headsets by the first microphone of the first headset;

transmitting the captured speech (n[n]) from the first headset to one or more other headsets of the plurality of headsets;

reproducing the transmitted speech (h[n]) at respective listening positions of the at least two listening positions related to users of the respective one or more other headsets by the one or more loudspeakers of the one or more other headsets; and cancelling speech originating from the first user and being transmitted to the at least two listening positions related to users of the respective one or more other headsets via a primary path by a passive noise cancellation method, an active noise cancellation method, or a combination thereof, wherein, for each of the at least two listening positions related to the users of the respective one or more other headsets, the method includes:

determining a time offset between a time of arrival at the listening position of speech originating from the first user transmitted via the primary path and a time when the speech originating from the first user is reproduced at the listening position by the one or more loudspeakers of a respective headset of the one or more other headsets;

capturing an ambient noise signal (m[n]) by at least one microphone of the respective headset, wherein the ambient noise signal (m[n]) comprises noise as well as the speech originating from the first user transmitted via the primary path; and reproducing the noise and the speech originating from the first user transmitted via the primary path to the listening position by transferring the ambient noise signal (m[n]) to the respective listening position by the one or more loudspeakers, wherein a time between capturing the ambient noise signal (m[n]) and transferring the ambient noise signal (m[n]) to the respective listening position corresponds to the determined time offset.

8. The method of claim 7, wherein the active noise cancellation method comprises:

capturing, for each listening position of the at least two listening positions related to the users of the respective one or more other headsets, an error signal by the one or more second microphones of the one or more other headsets, wherein the error signal is representative of a disturbing noise signal (d[n]) reaching a listening position of the at least two listening positions, and wherein the disturbing noise signal (d[n]) comprises noise as well as the speech originating from the first user transmitted via the primary path;

generating a compensation signal (y[n]) based on the error signal; and suppressing the disturbing noise signal (d[n]) at the listening position by transferring the compensation signal (y[n]) to a respective listening position of the at least two listening positions by the one or more loudspeakers of a respective headset of the one or more other headsets.

* * * * *